Patented Mar. 17, 1925.

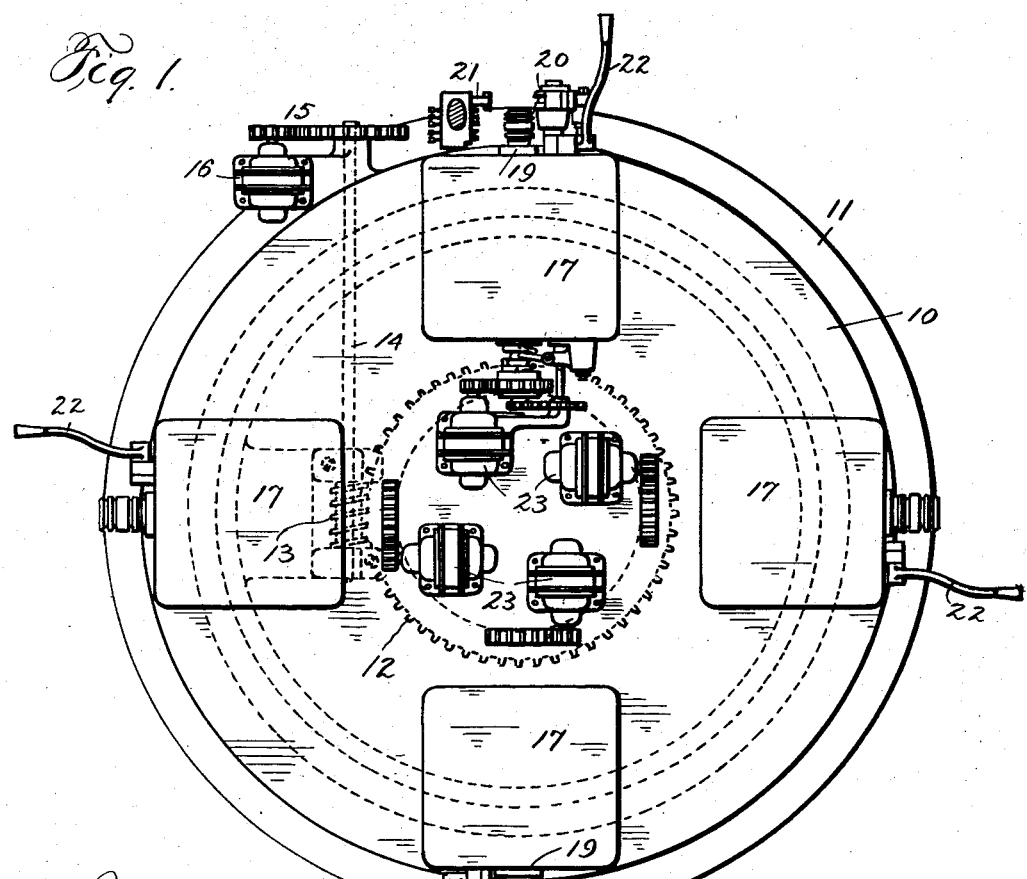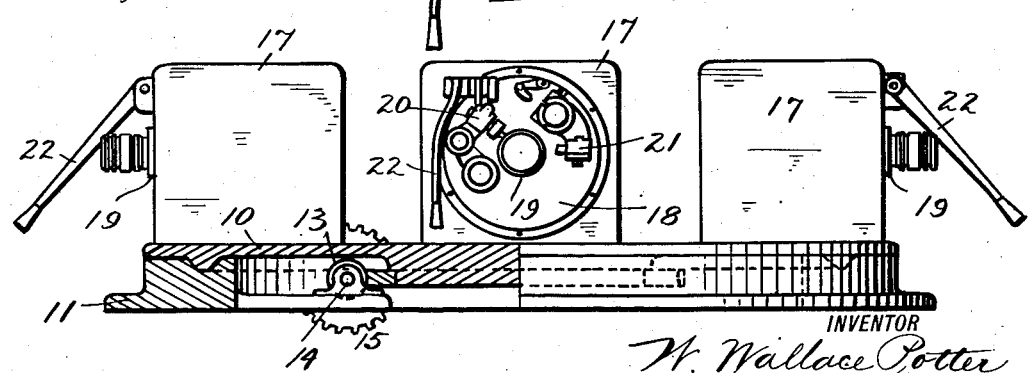

1,529,809

UNITED STATES PATENT OFFICE.

WILLIAM WALLACE POTTER, OF PAWTUCKET, RHODE ISLAND.

MACHINE TOOL.

Application filed February 4, 1924. Serial No. 690,565.

*To all whom it may concern:*

Be it known that I, WILLIAM WALLACE POTTER, residing at Pawtucket, Rhode Island, a citizen of the United States, have invented certain new and useful Improvements in Machine Tools, of which the following is a specification.

My invention relates to machine tools of the kind or type that comprises a series or collection of tools that are simultaneously operated and are supported, as by means of a rotatable support, so that they are presented in succession at the work place or station where stands the operator to put in the piece of work in the rough and to remove the finished work. The object of my invention is to render of minimum importance the disabling or non-productiveness of any one tool unit of the group or series and to permit the expeditious substitution for such a unit of a perfectly working unit. By my invention when any one unit becomes inoperative it does not involve the disabling of the whole machine with consequent great loss in production and addition to the overhead.

Briefly described, my invention comprehends the use of a series or group of machine tools capable of automatically performing the desired turning or forming operations upon a desired piece of work so that the workman is called upon to do nothing but to place the rough piece in the chuck or workholder and later to remove the finished work therefrom, these separately operating units being mounted upon a traveling support from which the operative mechanism of the unit may be removed intact from a suitable casing, for repair and replacement or for the substitution of another complete mechanism, the traveling support bringing the units one after another to the workman's station.

My invention consists in whatever is described by or is included within the terms or scope of the appended claims.

In the drawings:

Fig. 1 is a plan view of a machine embodying my invention;

Fig. 2 is a side elevation with parts in section.

As shown in the drawings there are four units mounted equi-distant apart upon a turntable, 10, which rotatably rests upon a base, 11, the turntable having on its underside a worm wheel, 12, with which meshes a worm, 13, on a horizontal shaft, 14, which extends to the outside of the base, 11, where, by means of a train of gears, 15, it may be revolved by an electric motor, 16, mounted on the base 11. Of course, I do not limit myself to any particular number of machine tool units nor to any particular mechanism for rotating the table. The table is preferably rotated at a rate which will give one complete revolution to the turntable in the time required for each machine tool unit to perform its operations so that each unit will move from the station designated A at one side of the machine and back thereto in the time required for the turning or forming operations to be performed. Of course, should the operations be performed in so short a time that the movement of the machine tool unit would be too fast for the workman while standing at his station to apply and remove the work, the revolution of the turntable could be stopped long enough to permit the workman to perform such operations.

Each of the units consists of a shell or casing, 17, standing upright on the top of the turntable and fixed thereto which has a cylindrical horizontally extending chamber in which is removably mounted a cylindrical frame or support, 18, which carries all the mechanism concerned in enabling the tool unit to perform its intended operations, such mechanism comprising a chuck, 19, tool holders, 20 and 21, respectively, and a hand lever, 22, by which the workman controls the operation of the unit. With the detailed construction of the mechanism which forms the tool unit this present application is not concerned and it is therefore unnecessary to illustrate and describe the same further than has already been done. In fact, however, the construction, arrangement and operation of parts carried by the frame or support, 18, and the latter are preferably identical with what is shown, described and claimed in my pending application No. 679,965 and it is because claims are made in that application thereto that no claims specifically are made herein. As in the case of that application the mechanism of each unit is driven by its own electric motor, 23, which by gearing not necessary to be described herein imparts the proper movements to the mechanism of the machine tool unit and each electric motor, 23, is mounted upon the turntable and when the mechanism supported by the removable frame, 18, is removed from the shell or casing, 17, all as is fully explained in my above mentioned application, there is no disturbance of the motor.

It will be seen that each machine tool unit being wholly independent of the others, the disabling of any one unit does not interfere with the continued use of the machine with the remaining units and as the essential mechanism of each unit may be removed intact from the unit support on the turntable, the removal of the essential mechanism of a disabled unit and the substitution of a perfectly working mechanism may be most speedily done so that but little time need be lost in having the full complement of units at work, should it be undesirable to continue the operation of the machine with a less number than the full complement of units.

What I claim is:

1. An organization comprising a group of machine tool units, each unit including work holding means and tool holding means, a traveling support which moves the units in succession to and from a station, the essential mechanism of each unit being removable intact from such support.

2. An organization comprising a group of machine tool units, each unit including work holding means and tool holding means, a traveling support which moves the units in succession to and from a station, and a frame for the essential mechanism of the unit which is removable from the support and replaceable thereon independently of the similar frame of other units.

3. An organization comprising a group of machine tool units, each unit including work holding means and tool holding means, each comprising a shell or casing and a frame removably mounted in such casing carrying the machine tool mechanism and a traveling support upon which said unit casings are mounted, said support moving the units in succession to and from a station.

4. An organization comprising a group of machine tool units, each unit including work holding means and tool holding means, a traveling support which moves such units in succession to and from a station and motor means for driving the mechanism of each unit independently of the others.

5. An organization comprising a group of machine tool units, each unit including work holding means and tool holding means, a traveling support which moves said units in succession to and from a station, and means for driving the mechanism of each unit independently of the other.

In testimony whereof I hereunto affix my signature.

WILLIAM WALLACE POTTER.